United States Patent [19]

Ichiki

[11] Patent Number: 5,120,354
[45] Date of Patent: Jun. 9, 1992

[54] METHOD OF DISPOSING OF FIBER REINFORCED ALUMINUM ALLOY COMPOSITE

[75] Inventor: Takashi Ichiki, Fujisawa, Japan

[73] Assignee: Tokai Carbon Co., Ltd., Tokyo, Japan

[21] Appl. No.: 696,792

[22] Filed: May 7, 1991

[30] Foreign Application Priority Data

May 28, 1990 [JP] Japan ................... 2-138037

[51] Int. Cl.$^5$ ............................................. C21C 7/00
[52] U.S. Cl. ................................................. 75/568
[58] Field of Search ........................................ 75/568

[56] References Cited

U.S. PATENT DOCUMENTS 4,128,414 12/1978 Hater .......................... 75/568
4,142,887 3/1979 Luyckx ........................ 75/568

Primary Examiner—Peter D. Rosenberg
Attorney, Agent, or Firm—Armstrong & Kubovcik

[57] ABSTRACT

A method of disposing of a fiber reinforced aluminum alloy composite, which comprises putting an aluminum alloy composite reinforced with inorganic short fibers into a molten steel in the deoxidizing process for steel production.

8 Claims, No Drawings

METHOD OF DISPOSING OF FIBER REINFORCED ALUMINUM ALLOY COMPOSITE

BACKGROUND OF THE INVENTION

The present invention relates to a method of disposing of a waste fiber reinforced aluminum alloy composites. More particularly, the present invention is concerned with a method of disposing of a fiber reinforced aluminum alloy composite by which inorganic short fibers contained in the composite can be discarded after being transformed into a form which is harmless to the human body.

In recent years, a metal composite reinforced with an inorganic short fiber is being put to practical use as a highly functional composite. Especially, the availability for a wide variety of applications is being expected on the fiber reinforced aluminum alloy composite comprising an aluminum alloy as a matrix and an inorganic short fiber as a reinforcement, because the composite exhibits performances derived from a composite structure which is characterized by a combination of a light weight with markedly high strength, rigidity, flexibility, etc. In such a fiber reinforced aluminum alloy composite, ceramic whiskers composed of fine acicular single crystals of SiC, $Si_3N_4$, $Al_2O_3$, ZnO or the like or chopped fibers obtained by chopping long fibers of SiC, $Al_2O_3$, $SiO_2$ or the like are used as the inorganic short fiber, which are generally composited with an aluminum alloy as a matrix by powder metallurgy or squeeze casting.

Recently, however, it has been pointed out that such an inorganic fiber, especially a whisker having a fine acicular fiber form, is likely to reside in the lump when inhaled in a human respiratory system, thereby causing health damages. Hence, safety measures are under study during the manufacture of the inorganic short fiber and handling thereof in bulk (powder). However, no study is in progress on the disposal of wastes, such as process scraps and return scraps of the composite generated in the step of manufacturing the composite and spent parts generated in the stage of practical use.

These wastes do not cause any damage to the human body by flying about, unlike other wastes in bulk (powder) form, because the inorganic short fiber is dispersed and carried in the texture of the aluminum alloy matrix. However, the discarding of these wastes as such is not desirable from the viewpoint of health problems, because SiC whiskers are extremely stable and will fly about, though the aluminum alloy will be corroded.

A possible countermeasure therefor comprises dissolving the wastes for recycle. However, when the wastes are redissolved, the whiskers form agglomerates and thus fail to effect a uniform dispersion in the matrix. Hence such redissolution is a less feasible measure at present.

SUMMARY OF THE INVENTION

An object of the present invention is to provide a method of disposing of a fiber reinforced aluminum alloy composite, by which the inorganic short fibers dispersed as a reinforcement can be discarded after being transformed into a form which is harmless to the human body and at the same time the matrix aluminum alloy can be utilized for steel refining. The above-described object of the present invention can be attained by putting an aluminum alloy composite reinforced with inorganic short fibers into a molten steel in the deoxidizing process for steel production.

DESCRIPTION OF THE PREFERRED EMBODIMENTS

In the present invention, the fiber reinforced aluminum alloy composite to be disposed of comprises, as the inorganic short fiber, a ceramic whisker or chopped fiber which has hitherto been employed as a reinforcement for the above-described metal composite.

On the other hand, examples of the matrix aluminum alloy include aluminum alloys for elongating materials, such as Al-Cu-Mg-base alloys (ASTM No. 2618), Al-Mn-base alloys (ASTM No. 3003), Al-Mg-base alloys (ASTM No. 5052) and Al-Si-Mg-base alloys (ASTM No. 6061) and aluminum alloys for casting materials, such as Al-Mg-Si-base alloys (ASTM No. 356.1), Al-Mg-base alloys (ASTM No. 355.0) and Al-Si-Mg-Cu-Ni-base alloys (ASTM No. 332.0). The composite can be produced by a conventional process from the above-described inorganic short fiber and the aluminum alloy. The composite to be disposed of in the present invention is waste generated in all stages, for example, defective composites and process scraps generated in the step of manufacturing the composite, and broken parts and spent parts generated in the stage of practical use, and thus the form thereof is not particularly limited.

Wastes of a fiber reinforced aluminum alloy composite are put into a molten steel in the deoxidizing process for steel production. Generally, the deoxidizing process comprises adding a deoxidizer at the time of transferring the molten steel to a ladle, and the wastes of the composite may be put into the molten steel either along with the deoxidizer or in place of the deoxidizer.

The wastes of the fiber reinforced aluminum alloy composite which have been put into the molten steel are immediately melted, and the inorganic short fibers of the composite are decomposed and denatured in the molten steel heated to a temperature above 1600° C. to be mainly incorporated into a slag in a state no longer exhibiting a fibrous form.

On the other hand, the aluminum component of the matrix aluminum alloy functions as a deoxidizer and rapidly reacts with the oxygen contained in the molten steel to thereby form $Al_2O_3$ as a slag component. At this time, it is assumed that part of the silicon and the manganese of the alloy composition forms a solid solution as an effective component of steel and part of the magnesium, silicon and manganese respectively forms oxides, such as MgO, $SiO_2$ and MnO, and is incorporated into a slag.

Through such an action, the inorganic fibers contained in the wastes of the composite are recovered as a slag having the fibers transformed into a form which is harmless to the human body and at the same time the matrix aluminum alloy component functions as a deoxidizer or the like for advantageous utilization thereof.

The present invention will now be described with reference to the following Examples. In the Examples, SiC whiskers are used as an inorganic short fiber. Similar results are obtained, however, when the fiber reinforced aluminum alloy composite contains other inorganic short fibers as a reinforcement.

EXAMPLES $\beta$-SiC whiskers each having a diameter of 0.5 to 2.0 $\mu$m and a length of 30 to 100 $\mu$m were dispersed in water, pressed, filtered and molded into a preform.

Molten matrix aluminum alloy (AC8A) was introduced under pressure into the obtained preform to produce a SiC whisker reinforced aluminum alloy composite by squeeze casting. The volume fraction (Vf) of the SiC whiskers in the composite was 20%.

A platinum crucible was charged with 500 g of steel ingot as a steel source and 100 g in total of $SiO_2$, CaO, $Al_2O_3$ and MgO having respective proportions of 4:3:2:1 as a slag source. The crucible was set in a high frequency electric furnace (200V, 1000 Hz), followed by heat melting to thereby give a molten steel having a temperature of 1650° C.

0.3 g of broken pieces of the above-described SiC whisker reinforced aluminum alloy composite were put into the molten steel, and agitated together with the molten steel.

The broken composite pieces put into the molten steel underwent vigorous reaction and decomposition in the molten steel. The Al component reacted with the oxygen contained in the molten steel to form $Al_2O_3$ as a slag. Separated SiC whiskers were partially decomposed in the molten steel into silicon and carbon components and the silicon component was converted into $SiO_2$ as a slag, while the C component was converted into CO gas, and flew away. The rest of the SiC whiskers were transformed into globules no longer exhibiting a fibrous form and were incorporated into the slag.

Thus it was confirmed that the discarding of the slag would not cause any problem on the human health due to whiskers.

As described above, by virtue of the method of disposal of the present invention, it is possible to discard fine inorganic fibers contained in the wastes of the fiber reinforced aluminum alloy composite by transforming them into a form which is harmless to the human body and at the same time exert the effect of advantageously advancing the deoxidizing process of the molten steel during steel production.

Therefore, the present invention eliminates the factors limiting the development of a fiber reinforced aluminum alloy composite, and greatly contributes toward the promotion of the practical use of the same.

What is claimed is:

1. A method of disposing of composite comprising an alloy containing an aluminum component and reinforced with short inorganic fibers, which comprises putting the composite reinforced with short inorganic fibers into molten steel during a deoxidizing process for steel production to thereby form a slug from the aluminum component contained in said composite and decompose and denature the short inorganic fibers in said composite so as to no longer retain the state of being fiber; and allowing the resulting decomposed and denatured short inorganic fibers to be taken into said slug together with components contained in said composite other than said aluminum component.

2. A method according to claim 1, wherein said inorganic short fibers are whiskers selected from the group consisting of SiC, $Si_3N_4$, $Al_2O_3$ and ZnO whiskers.

3. A method according to claim 1, wherein said inorganic short fibers are chopped fibers prepared from long fibers selected from the group consisting of SiC, $Al_2O_3$ and $SiO_2$ long fibers.

4. A method according to claim 1, wherein said aluminum alloy is selected from the group consisting of Al-Cu-Mg-base alloys, Al-Mn-base alloys, Al-Mg-base alloys and Al-Si-Mg-base alloys for use as an elongating material.

5. A method according to claim 1, wherein said aluminum alloy is selected from the group consisting of Al-Mg-Si-base alloys, Al-Mg-base alloys and Al-Si-Mg-base alloys for use as a casting material.

6. A method according to claim 1, wherein said composite reinforced with inorganic short fibers is a waste of the composite.

7. A method according to claim 6, wherein said waste of the composite is put in the molten steel simultaneously with a deoxidizer.

8. A method according to claim 6, wherein said waste of the composite is put in the molten steel in place of a deoxidizer.

* * * * *